(12) United States Patent
Mirho (10) Patent No.: US 10,402,466 B2
(45) Date of Patent: Sep. 3, 2019

(54) SYSTEM AND METHOD TO CONSTRUCT AND DELIVER STREAMING INNOVATION CHANNELS

(71) Applicant: TurboPatent, Seattle, WA (US)

(72) Inventor: Charles A Mirho, Lake Oswego, OR (US)

(73) Assignee: TurboPatent Inc., Seattle, WA (US)

( * ) Notice: Subject to any disclaimer, the term of this patent is extended or adjusted under 35 U.S.C. 154(b) by 1014 days.

(21) Appl. No.: 14/609,398

(22) Filed: Jan. 29, 2015

(65) Prior Publication Data

US 2015/0213064 A1 Jul. 30, 2015

Related U.S. Application Data

(60) Provisional application No. 61/933,005, filed on Jan. 29, 2014.

(51) Int. Cl.
*G06F 16/00* (2019.01)
*G06F 16/958* (2019.01)

(52) U.S. Cl.
CPC .................. *G06F 16/958* (2019.01)

(58) Field of Classification Search
CPC .......................... G06F 17/3089; G06F 16/958

USPC ......................................................... 707/736
See application file for complete search history.

(56) References Cited

U.S. PATENT DOCUMENTS

| | | | | |
|---|---|---|---|---|
| 6,816,858 B1* | 11/2004 | Coden | .................. | G06F 16/748 707/750 |
| 7,370,024 B2* | 5/2008 | Tsukamoto | ........... | G06F 16/355 706/46 |
| 2009/0282054 A1* | 11/2009 | Casey | ..................... | G06F 16/93 |
| 2013/0054613 A1* | 2/2013 | Bishop | ................ | G06F 17/2705 707/748 |
| 2013/0317994 A1* | 11/2013 | Tran | ..................... | G06Q 50/184 705/310 |

* cited by examiner

*Primary Examiner* — Chelcie L Daye
(74) *Attorney, Agent, or Firm* — Rowan Tels LLC (57) ABSTRACT

Feature extraction logic is operated on a digital source text to organize a machine memory into a source feature representation of one or more of a system, an apparatus, a process, and a composition of matter. The source feature representation is applied as a control sequence to a database management system for a digital database to produce a group of correlated feature representations that exceed an overall feature correlation threshold with the source feature representation. Transformation logic is operated on the correlated feature representations to produce a digital multiplex of graphical drawings depicting the correlated feature representations.

20 Claims, 5 Drawing Sheets

SYSTEM AND METHOD TO CONSTRUCT AND DELIVER STREAMING INNOVATION CHANNELS

CROSS-REFERENCE TO RELATED APPLICATIONS

This application claims priority and benefit under 35 U.S.C. 119 to U.S. application Ser. No. 61/933,005, filed on Jan. 29, 2014 and incorporated herein by reference in its entirety.

BACKGROUND

Digital content may be delivered as channels, which are network locations for accessing and activating a digital stream for delivery to endpoint devices such as phones and personal computers.

There is a need for channels that not only educate but also stimulate creativity especially in practical innovation of apparatuses, systems, processes, and compositions of matter (e.g., chemicals, articles of manufacture).

BRIEF SUMMARY

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"DBMS" in this context refers to a database management system, logic that provides for the definition, creation, querying, update, and administration of databases. Well-known DBMSs include MySQL, PostgreSQL, SQLite, Microsoft SQL Server, Microsoft Access, Oracle, SAP, dBASE, FoxPro, and IBM DB2.

"logic" in this context refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Module" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process.

Description

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Feature extraction logic is operated on a digital source text to organize a machine memory into a source feature representation of one or more of a system, an apparatus, a process, and a composition of matter (e.g., chemicals, articles of manufacture). The source feature representation is applied as a control sequence to a database management system for a digital database to produce a group of correlated feature representations that exceed an overall feature correlation threshold with the source feature representation.

Transformation logic is operated on the correlated feature representations to produce a digital multiplex of graphical drawings depicting the correlated feature representations. A video pump is then operated on the digital multiplex.

In some embodiments, the correlated feature representations are input to an obfuscator to remove or obscure indicia of content source from which the correlated feature representations are derived. The obfuscator may replace textual terms that include the indicia of content source in the correlated feature representations with analogous features that are source-neutral. It may also remove, replace, or obscure source-identifying features in graphics, drawings, and other non-textual data of the correlated feature representations.

In some embodiments, the digital database is restricted to a set of digital documents having at least one common associated inventor. In some embodiments, the digital database is restricted to a set of digital documents having at least one common associated assignee. In some embodiments, the digital database restricted to a set of digital documents having at least one common associated official filing date matching a date range condition.

Likewise, the digital source text may include a set of digital documents having at least one common associated inventor, or may include a set of digital documents having at least one common associated assignee.

In some embodiments, the digital multiplex may include a Venn Diagram of the correlated feature representations, and/or the graphical drawings depicting the correlated feature representations may include one or more of block diagrams and flow charts generated from text of the correlated feature representations.

In another aspect the feature extraction logic is operated on a digital source text to organize a machine memory into a source feature representation of one or more of a system, an apparatus, a process, and a composition of matter. The digital source text is a set of digital documents having at least one common associated inventor, or a set of digital documents having at least one common associated assignee. The transformation logic is operated on the source feature representations to produce a digital multiplex of graphical drawings depicting the source feature representations. A video pump is then operated on the digital multiplex.

Broadly speaking, in a digital content channel formation and delivery system, content is selected, organized, reformatted, and streamed according to features extracted from a digital source text 104. The digital source text 104 may for example be the text of one or more claims of a patent or patent application document. A digital channel for streaming to user devices (e.g., personal computers or mobile phones) may be automatically created from features (e.g., parts of speech, POS) extracted from the digital source text 104 and converted to source feature representations 122 in a machine memory 106.

A digital channel comprising a digital multiplex 114 including graphical drawings 116 that pictorially represent the source feature representations 122, or correlated feature representations 108 for the source feature representations 122 may be dynamically generated and streamed using a video pump 118. The digital source text 104 may be generated by identifying a digital document or set of documents (e.g., by patent number, by patent application number, by document title, by inventor or author name, etc.) or by identifying and/or copying one or more claims from said document or set of documents. Conventional control features may be provided for the digital channel such as "like", "don't like", "skip", "fast forward", "pause", and "rewind". "Channel" refers to a digital stream of bits that may be rendered and viewed by mobile devices and computers using, for example, media player applications or web browsers.

The one or more digital database 112 from which the digital source text 104 and/or correlated feature representations 108 are derived may be public or private databases. Public databases are accessible to the general public, either free or for a fee. Public databases include databases of granted patents and published patent applications. Public databases also include technical and scientific articles published in magazines, dailies, and journals.

Public or private patent databases may be preferred as sources for the digital source text 104 and/or correlated feature representations 108. The digital source text 104 may be derived from patent drawings or corresponding descriptions of the drawings in the body of the patent or patent application. Data mining and multidimensional vector fit algorithms may be applied to identify the correlated feature representations 108 corresponding to the digital source text 104. The correlated feature representations 108 may comprise organizations of the machine memory 106 representing collective features of patent or patent application claims "fitting" the apparatus, system, or process features of the digital source text 104.

The transformation logic 120 may transform the source feature representations 122 and/or the correlated feature representations 108 into graphical drawings 116 illustrating components of an apparatus or system (e.g., block diagram), or actions of a process (e.g., flow chart). The transformation logic 120 may further transform the source feature representations 122 and/or correlated feature representations 108 by adding color to the drawings, adding numbering and/or annotation, or even animating the presentation of the drawings. Audio narration of the graphical drawings 116 may be included in the digital multiplex 114. Text to speech technology may be applied to convert text of the digital source text 104 and/or correlated feature representations 108 to audio that is included in the digital multiplex 114.

The transformation logic 120 may comprise or cooperate with an obfuscator 124 logic to obfuscate the source feature representations 122 and/or correlated feature representations 108, or the graphical drawings 116 generated therefrom. Obfuscation removes indicia of ownership, authorship, inventorship, and/or source of the source feature representations 122 and/or correlated feature representations 108 and/or graphical drawings 116, so that a person experiencing the digital multiplex 114 of the digital channel is not imparted with any specific or intentional knowledge that would imply ownership, patented status, inventorship, or authorship of a particular invention.

In one embodiment, the source feature representations 122 are a set of text terms representing a "core" of components and interactions, and/or actions, extracted from the digital source text 104 by the feature extraction logic 102. This "core" set may comprise less than all the components/interactions/actions identified in the digital source text 104. The correlated feature representations 108 may represent feature sets overlapping the core set to some configured extent.

In some embodiments an identification is made of recombinations and/or different compositions and/or arrangements (remove components, add components, remove actions, add actions, etc.) of features of an apparatus, system, and/or process represented by the source feature representations 122 and/or correlated feature representations 108. A Venn diagram may be generated and included in graphical drawings 116 illustrating core features, i.e., core components, actions, and interactions common to the source feature representations 122 and/or correlated feature representations 108 (areas of high overlap in the Venn diagram). Variability of the core set may be identified (e.g., areas of low or no overlap) and applied to the core set by variator 126 logic, and graphical drawings 116 illustrating possible applications of the variability (e.g., new species of the apparatus, system, or process of the core feature set) may be generated and included in the digital multiplex 114.

DRAWINGS

Figure 1:
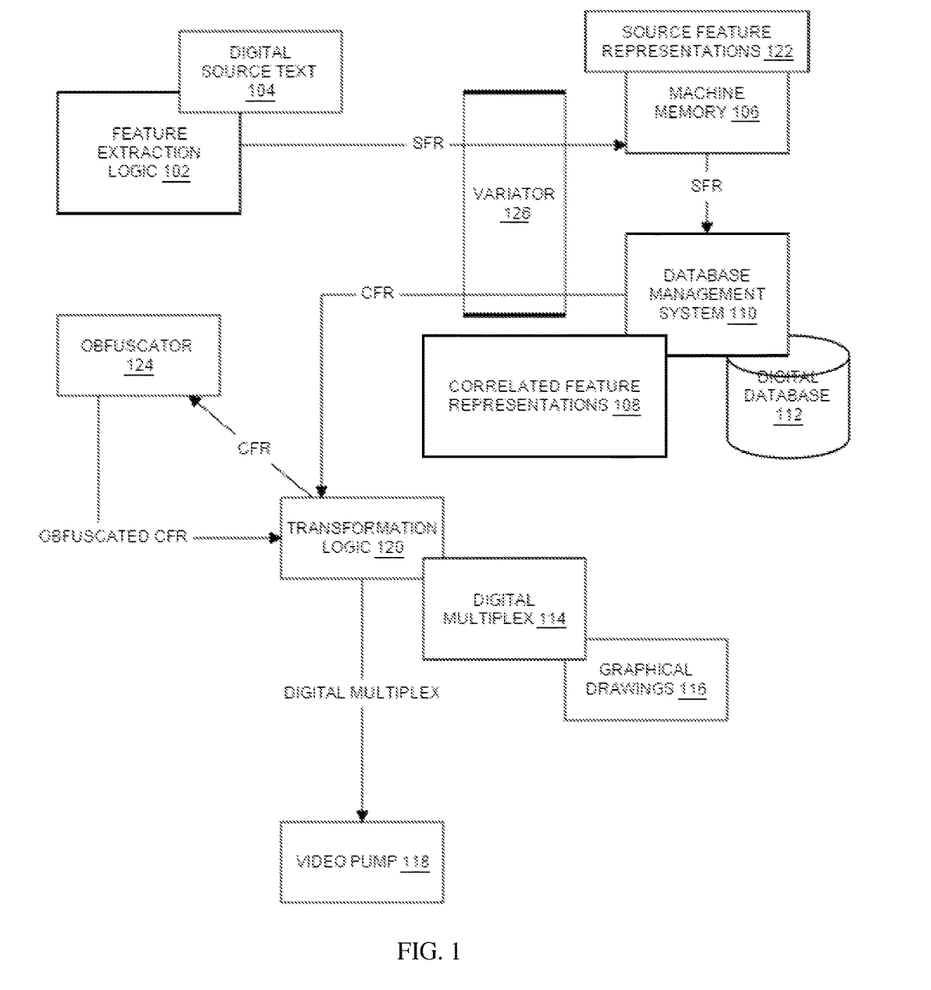
FIG. 1 is a system diagram of an embodiment of a digital content channel formation and communication system.
Figure 2:
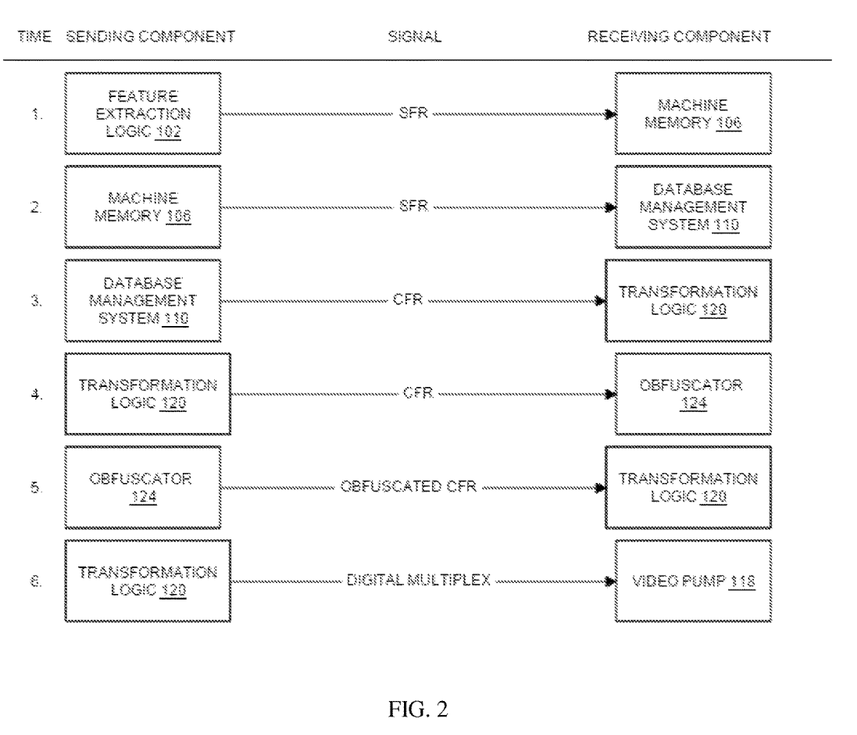
FIG. 2 is an action flow diagram of an embodiment of a digital content channel formation and communication process.
Figure 3:
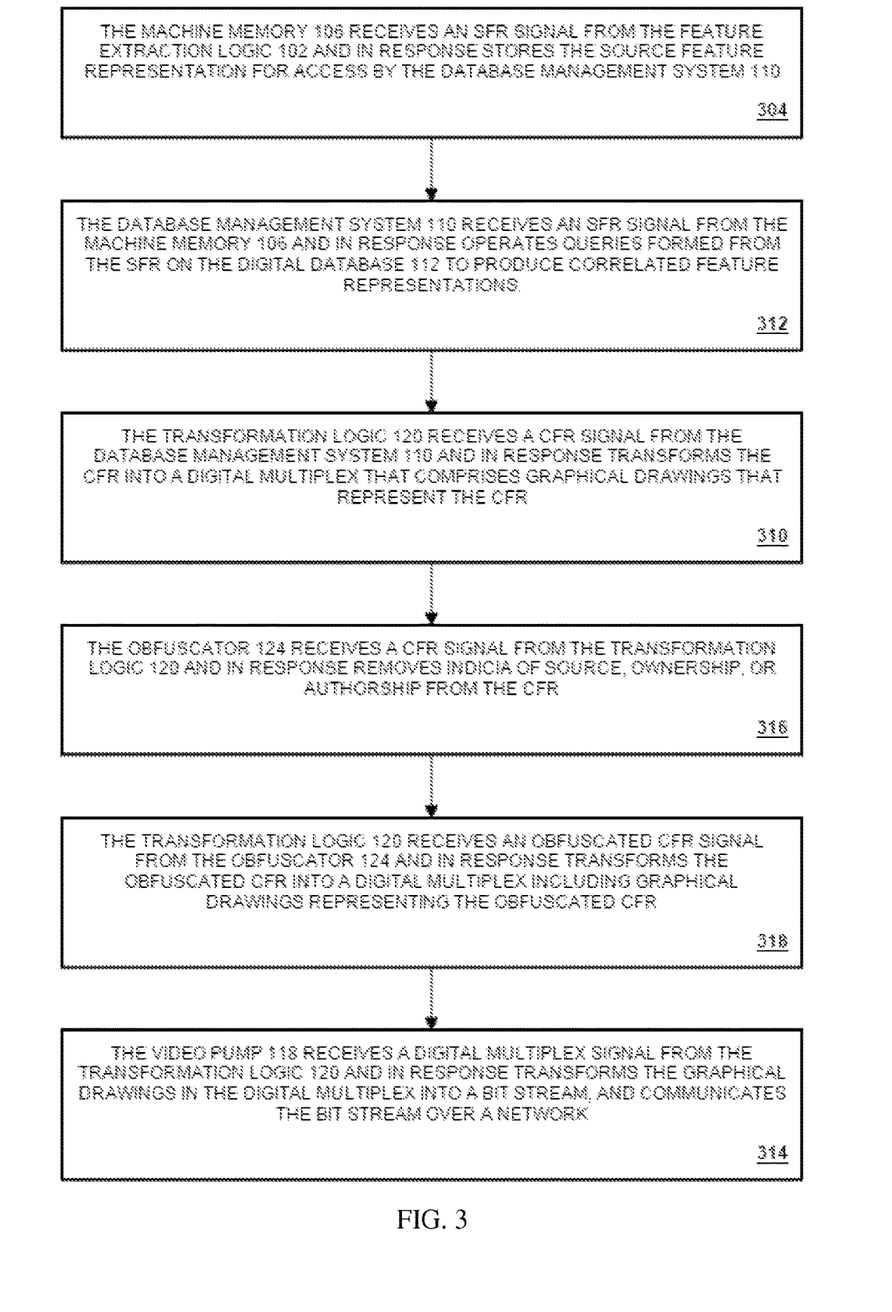
FIG. 3 is a flow chart of an embodiment of a digital content channel formation and communication process.

FIG. 1 is a system diagram of an embodiment of a digital content channel formation and communication system. FIG. 2 is an action flow diagram of an embodiment of a digital content channel formation and communication process. FIG. 3 is a flow chart of an embodiment of a digital content channel formation and communication process.

The system comprises feature extraction logic 102, digital source text 104, machine memory 106, correlated feature representations 108 (CFR), database management system 110, digital database 112, digital multiplex 114, video pump 118, transformation logic 120, source feature representations 122 (SFR), variator 126, and graphical drawings 116. Each of these elements is implemented by logic, and in some embodiments some or all of these elements may be implemented as modules.

The feature extraction logic 102 forms the SFR from the digital source text 104. The machine memory 106 receives the SFR from the feature extraction logic 102 and in response stores the SFR for access by the database management system 110 (304). The database management system 110 receives the SFR from the machine memory 106 and in response operates queries formed from the SFR on the digital database 112, producing the correlated feature representations (CFR) (312). The transformation logic 120 receives the CFR from the database management system 110 and in response transforms the CFR into a digital multiplex that comprises graphical drawings that represent the CFR (310). The video pump 118 receives a digital multiplex from the transformation logic 120 and in response transforms the graphical drawings in the digital multiplex into a bit stream, and communicates the bit stream over a network (314).

In some embodiments, the transformation logic 120 may communicate the CFR to an obfuscator 124 that removes source, ownership, and/or authorship indicia from the CFR, returning an obfuscated CFR for tranformation into the digital multiplex 114 and graphical drawings 116.

The variator 126 is logic that may be applied in some embodiments to ascertain variability among the features of the source feature representations 122 and/or correlated feature representations 108, identifying a core set of features and features that represent variations of the core set.

Figure 4:
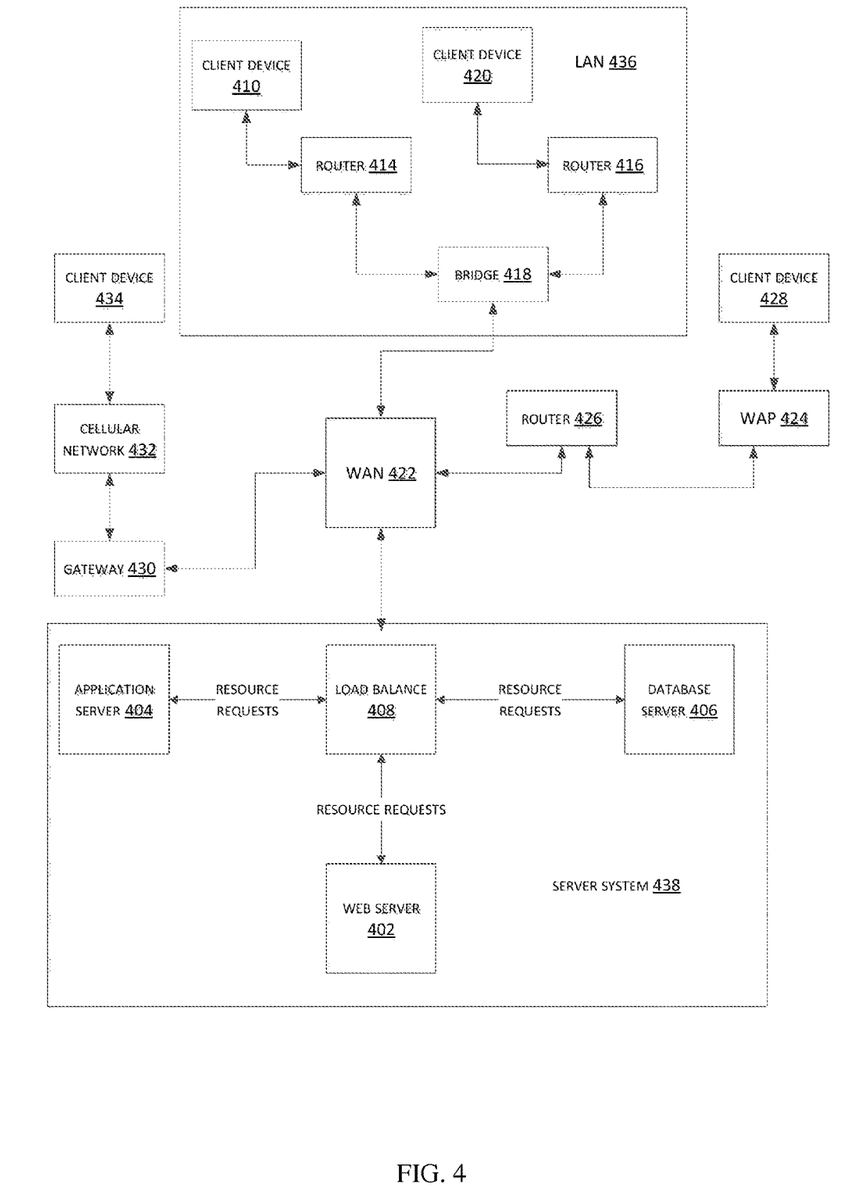
FIG. 4 illustrates a machine system that may implement an embodiment of a digital channel formation and delivery system

FIG. 4 illustrates a machine system that may implement an embodiment of a digital channel formation and delivery system. Several network access technologies between client devices and server resources are illustrated, including cellular network 432, LAN 436, and WAP 424. Signals representing server resource requests are output from client devices 410, 420, 428, and 434 to the various access networks, from which they are propagated to a WAN 422 (e.g., the Internet) and from there to a server system. These signals are typically encoded into standard protocols such as Internet Protocol (IP), TCP/IP, and HTTP. When the clients are part of a LAN 436, the signals may be propagated via one or more router 414 416 and a bridge 418. A router 426 may propagate signals from the WAP 424 to the WAN 422. A gateway 430 may propagate signals from the cellular network 432 to the WAN 422. The server system 438 in this example comprises a number of separate server devices, typically each implemented in the separated machine, although this is not necessarily the case. The signals from the client devices are provided via a load balancing server 408 to one or more application server 404 and one or more database server 416. Load balancing server 408 maintains an even load distribution to the other server, including web server 402, application server 404, and database server 406. Each server in the drawing may represent in effect multiple servers of that type. The load balancing server 408, application server 404, and database server 406 may collectively implement an embodiment of the system described herein. The signals applied to the database server 406 may cause the database server 406 to access and certain memory addresses, which correlates to certain rows and columns in a memory device. These signals from the database server 406 may also be applied to application server 404 via the load balancing server 408. Signals applied by the application server 404, via the load balancing server 408, to the web server 402, may result in web page modifications which are in turn communicated to a client device, as described herein in regards to user interface and interaction signals to and from a client device. The system described herein may thus be implemented as devices coordinated on a LAN, or over a wide geographical area utilizing a WAN or cellular network, or over a limited area (room or house or store/bar) utilizing a WAP. Features of client logic to interact with the described system may thus be implemented, for example, as an application (app) on a mobile phone interfacing to a network in one of the manners illustrated in this figure. The system described herein may be implemented as a pure or hybrid peer to peer system in a local or widely distributed area.

Figure 5:
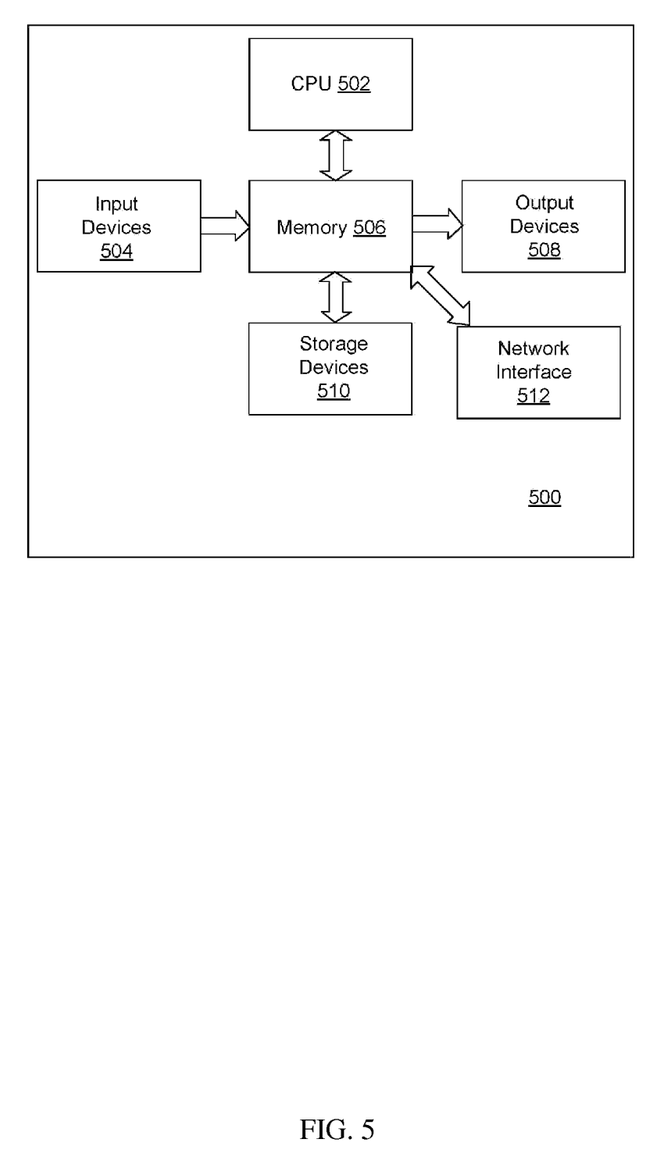
FIG. 5 illustrates a machine which can implement various elements described herein

FIG. 5 illustrates a machine which can implement various elements described herein (e.g., elements of FIG. 1 or FIG. 4). Input devices 504 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 504 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 504 are provided via various machine signal conductors (e.g., busses or network interfaces) and circuits to memory devices 506. The memory devices 506 is typically what is known as a first or second level memory device, providing for storage (via configuration of matter or states of matter) of signals received from the input devices 504, instructions and information for controlling operation of the CPU 502, and signals from storage devices 510. Information stored in the memory devices 506 is typically directly accessible to processing logic 502 of the device. Signals input to the device cause the reconfiguration of the internal material/energy state of the memory device 506, creating in essence a new machine configuration, influencing the behavior of the device 500 by affecting the behavior of the CPU 502 with control signals (instructions) and data provided in conjunction with the control signals. Second or third level storage devices 510 may provide a slower but higher capacity machine memory capability. Examples of storage devices 510 are hard disks, optical disks, large capacity flash memories or other non-volatile memory technologies, and magnetic memories. The processing logic 502 may cause the configuration of the memory 506 to be altered by signals in storage devices 510. In other words, the CPU 502 may cause data and instructions to be read from storage devices 510 in the memory 506 from which may then influence the operations of CPU 502 as instructions and data signals, and from which it may also be provided to the output devices 508. The CPU 502 may alter the content of the memory of 506 by signaling to a machine interface of memory 506 to alter the internal configuration, and then converted signals to the storage devices 510 to alter its material internal configuration. In other words, data and instructions may be backed up from memory 506, which is often volatile, to storage devices 510, which are often non-volatile. Output devices 508 are transducers which convert signals received from the memory 506 into physical phenomenon such as vibrations in the air, or patterns of light on a machine display, or vibrations (i.e., haptic devices) or patterns of ink or other materials (i.e., printers and 3-D printers). Communication interface 512 receives signals from the memory 506 and converts them into electrical, optical, or wireless signals to other machines, typically via a machine network. Communication interface 512 also receives signals from the machine network and converts them into electrical, optical, or wireless signals to the memory 506.

Embodiments of a digital channel formations and delivery system have been described. The following claims are directed to said embodiments, but do not preempt or encompass digital channels in the abstract. Those having skill in the art will recognize numerous other approaches to digital channel formation and delivery are possible and/or utilized commercially, and which do not utilize the inventive processes and specific interaction of those processes of the claims as an integrated whole, thus precluding any possibility of preemption or encompassing of digital channels in the abstract. The claimed system is not only configured for non-trivial and unconventional processing, it also improves, in one or more specific ways, the operation of a machine system for digital channel formation and creation and thus distinguishes from other approaches to the same problem/process in how its physical arrangement of a machine system determines the system's operation and ultimate effects on the material environment. Although that any system, process, apparatus or material may ultimately, with enough intellectual reduction, be reduced to basic or fundamental components (e.g., a computer may be reduced to circuits and conductors, a new medicine reduced to known atoms, etc.), described herein are novel and inventive configurations and interoperations of any such components to enable and implement novel and inventive devices and systems of devices that specifically improve the functioning of a digital channel formation and delivery system for stimulating innovation. The claims are not a mere general linking of an abstract idea to a technology environment, and require more than a generic computer performing generic functions that are well understood and routine and conventional, and previously known to the industry.

It will be further recognized that the claims do not preempt or wholly encompass any fundamental economic practice, idea in and of itself (e.g., a principle, original cause, or motive), or pure mathematical formula or relationship.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
   operating feature extraction logic on a digital source text to organize a machine memory into a source feature representation of one or more of a system, an apparatus, a process, and a composition of matter;
   applying the source feature representation as a control sequence to a database management system for a digital database to produce a plurality of correlated feature representations that exceed an overall feature correlation threshold with the source feature representation;
   operating transformation logic on the correlated feature representations to produce a digital multiplex of graphical drawings depicting the correlated feature representations; and
   operating a video pump on the digital multiplex.

2. The method of claim 1, further comprising:
   inputting the correlated feature representations to an obfuscator to remove or obscure indicia of content source from which the correlated feature representations are derived.

3. The method of claim 2, further comprising:
   the obfuscator replacing textual terms comprising the indicia of content source in the correlated feature representations with analogous features that are source-neutral.

4. The method of claim 1, further comprising:
   the digital database restricted to a set of digital documents having at least one common associated inventor.

5. The method of claim 1, further comprising:
   the digital database restricted to a set of digital documents having at least one common associated assignee.

6. The method of claim 1, further comprising:
   the digital database restricted to a set of digital documents having at least one common associated official filing date matching a date range condition.

7. The method of claim 1, further comprising:
   the digital source text comprising a set of digital documents having at least one common associated inventor.

8. The method of claim 1, further comprising:
   the digital source text comprising a set of digital documents having at least one common associated assignee.

9. The method of claim 1, further comprising:
   the digital multiplex comprising a Venn Diagram of the correlated feature representations.

10. The method of claim 1, further comprising:
    the graphical drawings depicting the correlated feature representations comprising one or more of block diagrams and flow charts generated from text of the correlated feature representations.

11. A computing apparatus including a processor and a machine memory configured such that, when executed in cooperation with controlling the processor, operate the apparatus to perform a method comprising:
    operating feature extraction logic on a digital source text to organize the machine memory into a source feature representation of one or more of a system, an apparatus, a process, and a composition of matter;
    applying the source feature representation as a control sequence to a database management system for a digital database to produce a plurality of correlated feature representations that exceed an overall feature correlation threshold with the source feature representation;
    operating transformation logic on the correlated feature representations to produce a digital multiplex of graphical drawings depicting the correlated feature representations; and
    operating a video pump on the digital multiplex.

12. The computing apparatus of claim 11, the method further comprising:
    inputting the correlated feature representations to an obfuscator to remove or obscure indicia of content source from which the correlated feature representations are derived.

13. The computing apparatus of claim 12, the method further comprising:
    the obfuscator replacing textual terms comprising the indicia of content source in the correlated feature representations with analogous features that are source-neutral.

14. The computing apparatus of claim 11, the method further comprising:
    the digital database restricted to a set of digital documents having at least one common associated inventor.

15. The computing apparatus of claim 11, the method further comprising:
    the digital database restricted to a set of digital documents having at least one common associated assignee.

16. The computing apparatus of claim 11, the method further comprising:
    the digital database restricted to a set of digital documents having at least one common associated official filing date matching a date range condition.

17. The computing apparatus of claim 11, the method further comprising:
    the digital source text comprising a set of digital documents having at least one common associated inventor.

18. The computing apparatus of claim 11, the method further comprising:
    the digital source text comprising a set of digital documents having at least one common associated assignee.

19. The computing apparatus of claim 11, the method further comprising:

the digital multiplex comprising a Venn Diagram of the correlated feature representations.

20. The computing apparatus of claim 11, the method further comprising:
the graphical drawings depicting the correlated feature representations comprising one or more of block diagrams and flow charts generated from text of the correlated feature representations.

\* \* \* \* \*